US011909819B1

(12) United States Patent
Dikshit et al.

(10) Patent No.: US 11,909,819 B1
(45) Date of Patent: Feb. 20, 2024

(54) SYNCHRONIZATION OF CLIENT IP BINDING DATABASE ACROSS EXTENDED NETWORKS LEVERAGING BGP CONTROL PLANE

(71) Applicant: Hewlett Packard Enterprise Development LP, Spring, TX (US)

(72) Inventors: Saumya Dikshit, Bangalore (IN); Thimma Reddy Gadekal, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/070,209

(22) Filed: Nov. 28, 2022

(51) Int. Cl.
*H04L 67/1095* (2022.01)
*H04L 69/16* (2022.01)

(52) U.S. Cl.
CPC .......... *H04L 67/1095* (2013.01); *H04L 69/16* (2013.01)

(58) Field of Classification Search
None
See application file for complete search history.

(56) References Cited

U.S. PATENT DOCUMENTS

| 8,364,949 B1* | 1/2013 | Bonica | H04L 63/06 713/153 |
| 2015/0124826 A1* | 5/2015 | Edsall | H04L 45/74 370/392 |
| 2020/0007583 A1* | 1/2020 | Dixit | H04L 63/102 |
| 2022/0400075 A1* | 12/2022 | Dikshit | H04L 41/0816 |

OTHER PUBLICATIONS

Klenze et al., "Formal Verification of Secure Forwarding Protocols", Aug. 2, 2021, IEEE, 2021 IEEE 34th Computer Security Foundations Symposium (CSF) (pp. 1-16) (Year: 2021).*
Durand et al., "BGP Operations and Security", Internet Engineering Task Force (IETF), Request for Comments: 7454, Feb. 2015, 26 pages.

(Continued)

*Primary Examiner* — Davoud A Zand
(74) *Attorney, Agent, or Firm* — Yao Legal Services, Inc.

(57) ABSTRACT

A method and system are provided which facilitate synchronization of client IP binding databases across an extended network by leveraging the BGP control plane. During operation, a switch configures a first synchronization identifier indicating validated Internet Protocol (IP) binding information of an associated client. The switch receives a Border Gateway Protocol (BGP) update message associated with a first client, wherein the BGP update message includes a second synchronization identifier. Responsive to determining that the second synchronization identifier matches the first synchronization identifier, the switch: extracts from the BGP update message reachability information, which includes media access control (MAC) and IP information associated with the first client; validates the MAC and IP information based on security policies; and adds the MAC and IP information to a local IP binding database, thereby allowing synchronization of the validated IP binding information of the first client between the switch and other switches.

20 Claims, 9 Drawing Sheets

(56) References Cited

OTHER PUBLICATIONS

Kompella et al., "Detecting Multi-Protocol Label Switched (MPLS) Data Plane Failures", Request for Comments: 4379, Feb. 2006, 50 pages.

Rosen et al., "IANA Registries for BGP Extended Communities", Internet Engineering Task Force (IETF), Request for Comments: 7153, Mar. 2014, 16 pages.

Sajassi et al., "BGP MPLS-Based Ethernet VPN", Internet Engineering Task Force (IETF), Request for Comments: 7432, Feb. 2015, 56 pages.

Sangli et al., "BGP Extended Communities Attribute", Request for Comments: 4360, Feb. 2006, 12 pages.

* cited by examiner

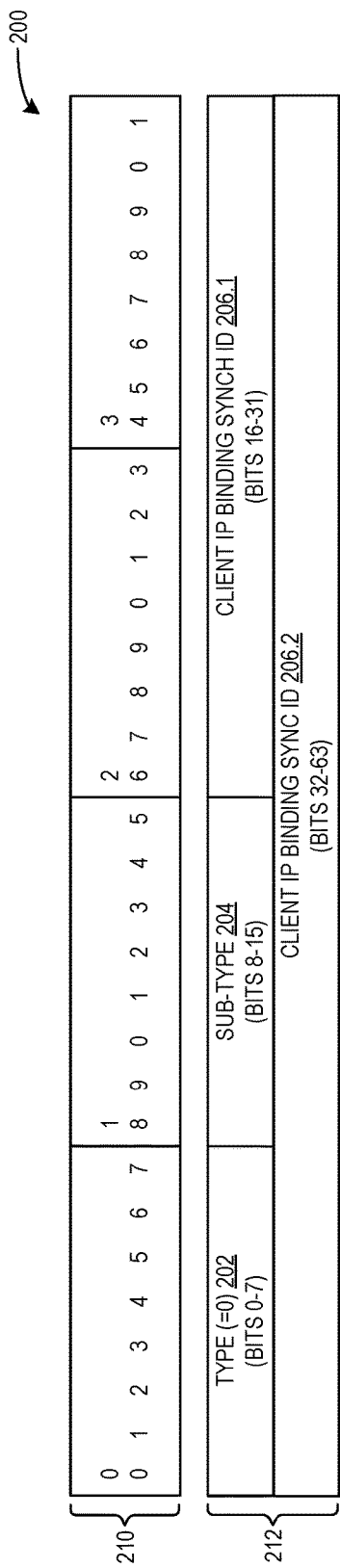

US 11,909,819 B1

SYNCHRONIZATION OF CLIENT IP BINDING DATABASE ACROSS EXTENDED NETWORKS LEVERAGING BGP CONTROL PLANE

BACKGROUND

Field

In an extended network with clients within and across multiple fabrics, one feature is synchronization of the client IP binding database, which stores learnt Media Access Control (MAC) and Internet Protocol (IP) details (IP bindings) of clients. Switches can build trusted databases to store validated IP bindings. However, these databases may be local to the access point or switch to which the clients are connected, while other access switches within or remote to a fabric in the extended network may treat the client as untrusted and/or unauthorized on a fabric in the extended network. This can result in switches denying services to legitimate clients.

BRIEF DESCRIPTION OF THE FIGURES

FIG. 2A illustrates an exemplary format for an extended communities path attribute indicating a client IP binding synchronization identifier, in accordance with an aspect of the present application.

FIG. 2B illustrates a table indicating a field, size, and description for the format of an extended communities path attribute indicating a client IP binding synchronization identifier, in accordance with an aspect of the present application.

In the figures, like reference numerals refer to the same figure elements.

DETAILED DESCRIPTION

Figure 1A:
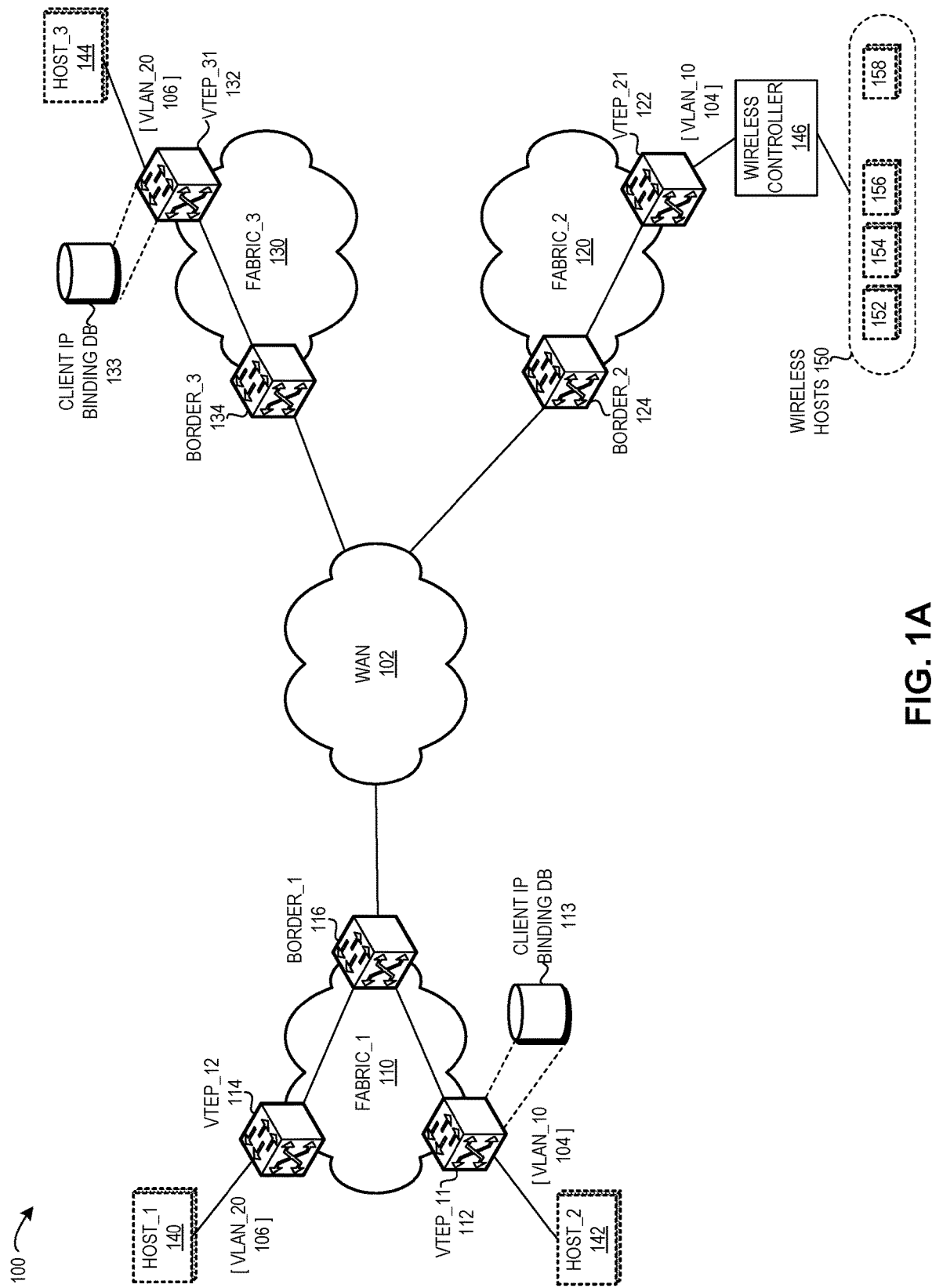
FIG. 1A illustrates an environment for a Layer 2 extended network, in accordance with an aspect of the present application.

The following description is presented to enable any person skilled in the art to make and use the aspects and examples, and is provided in the context of a particular application and its requirements. Various modifications to the disclosed aspects will be readily apparent to those skilled in the art, and the general principles defined herein may be applied to other aspects and applications without departing from the spirit and scope of the present disclosure. Thus, the aspects described herein are not limited to the aspects shown, but are to be accorded the widest scope consistent with the principles and features disclosed herein.

In an extended network with clients within and across multiple fabrics, one important feature is synchronization of the client IP binding database, which stores learnt MAC and IP details (IP bindings) of clients. Switches can build trusted databases to store validated IP bindings. However, these databases may be local to the access point or switch to which the clients are connected, while other access switches within or remote to a fabric in the extended network may treat the client as untrusted and/or unauthorized on a fabric in the extended network. This can result in switches denying services to legitimate clients. There is currently no known standard technique to achieve this synchronization between switches within or across extended networks, e.g., in an overlay network. For example, without this synchronization, a host which is authorized to access a first switch in an extended network (based on IP bindings validated by the first switch) may subsequently be incorrectly denied access to a second switch in the extended network, as described below in relation to FIG. 1C.

Aspects of the instant application address these challenges by providing a system and method which facilitates this synchronization in an extended or overlay network provisioned by a Border Gateway Protocol (BGP), e.g., over an Ethernet virtual private network (EVPN). An exemplary extended network is described below in relation to FIG. 1A. The system can define a new path attribute to be carried in a BGP update message which is subsequently published to all or select switches in the extended network. The new path attribute can be an extended communities (EC) type path attribute which indicates a "Client IP Binding Synchronization Identifier." An exemplary format of this EC type path attribute is described below in relation to FIGS. 2A and 2B. The BGP update message which carries this EC path attribute can also include the MAC and IP binding information of a given client. The BGP update message may also be referred to as a Route-Type-2 message.

Each switch in the extended network can configure the same synchronization identifier ("sync ID") and validate and store its own locally learned IP bindings (e.g., for its associated clients). Upon validating the IP binding of a first client, a first switch may generate and publish a BGP update message which includes the client's MAC and IP information and the sync ID (carried as an EC path attribute). A second switch may receive the BGP update message and determine that the received sync ID matches its previously configured sync ID. The second switch can extract, from the BGP update message, Network Layer Reachability Information (NLRI), which can include the MAC and IP information associated with the first client. The second switch can validate the MAC and IP information and add the validated MAC and IP information to its local client IP binding database. Exemplary operations of an overall system are described below in relation to FIG. 3, while operations of a first switch (e.g., a sending access switch) and of a second switch (e.g., a receiving access switch) are described below in relation to FIGS. 4, 5A, and 5B.

The described aspects, including the communications between the switches in the BGP-provisioned overlay network, can result in the synchronization of the validated IP binding information of the first client between the first switch and the second switch. This can further result in both a more expedited and a more correct process to handle the migration of the first client from the first switch to the second switch. Thus, by leveraging the BGP control plane and using an extension to the EC path attribute, the instant aspects can provide synchronization of validated client binding information between switches in an extended network.

The terms "coupled to," "attached to," and "associated with" are used interchangeably in this disclosure and refer to entities which may be reached in a single hop or which can communicate directly with each other.

The term "switch" can refer to, e.g., an access switch or a border switch. When used to describe the first-hop access switches which are coupled to hosts or clients, the term "switch" can also include virtual tunnel endpoints (VTEPs) or "access VTEPs" associated with virtual local area networks (VLANs).

The term "extended network" can refer to a network which includes multiple switches in multiple fabrics extended over, e.g., a WAN. An extended network may be used in a campus deployment or a data center deployment. An extended network can be a Layer 2 extended network or an overlay network, including but not limited to: an Ethernet virtual private network (EVPN); a virtual private local area network (LAN) service (VPLS); a virtual private wire service (VPWS); and a Layer 3 virtual private network (L3-VPN). The fabric in the overlay network can include, but is not limited to: a virtual extensible local area network (VxLAN); a multi-protocol label switching (MPLS) technique; a network virtualization using generic routing encapsulation (NV-GRE); and a general protocol extension (GPE) technique.

A "BGP update message" and a "BGP withdraw message" can be referred to as a "Route-Type-2" packet or message. In some aspects, the described BGP update and withdraw messages can include the new extended communities (EC) path attribute which carries the client IP binding synchronization identifier and related information. The format of this EC path attribute is described below in relation to FIGS. 2A and 2B.

The terms "host" and "client" are used interchangeably in this disclosure and refer to an entity, component, application, service, or computing device which is coupled to an access switch. The "IP binding information" of a client or host can include, e.g., the MAC address, a corresponding IP address, and/or the VLAN identifier.

Challenges in Facilitating Synchronization of Client IP Binding Database Across Extended Networks Switches in an extended network can build trusted databases of Layer 3 clients, e.g., by snooping into Dynamic Host Configuration Protocol (DHCP)/Neighbor Discovery (ND) packets in the client VLAN. Security and analytical applications may leverage these databases. Security applications may help in protecting the network from unauthorized and/or untrusted users, while analytical applications may help to gauge the nature of access with telemetry information for designated hosts. This information may help to maintain the health of the overall extended network in a secure and informed manner. For example, the system can prevent Address Resolution Protocol (ARP) cache depletion attacks and allow traffic only from known clients on access ports. The system can also prevent denial-of-service (DoS) and Man in the Middle (MITM) attacks.

FIG. 1A illustrates an environment 100 for a Layer 2 extended network, in accordance with an aspect of the present application. Environment 100 can include multiple fabrics which communicate over a wide area network (WAN), where each fabric can include multiple switches, including access switches and border switches. An overlay network (such as a Virtual Extensible Local Area Network (VxLAN)) may be defined by using the switches as virtual tunnel endpoints (VTEPs), where groups of switches may be assigned to a common VLAN identifier.

Border switches in a fabric_1 110, a fabric_2 120, and a fabric_3 130 can communicate with each other over a WAN 102. Fabric_1 110 can include an access switch or VTEP_11 112, an access switch or VTEP_12 114, and a border switch border_1 116. Fabric_2 120 can include an access switch or VTEP_21 122 and a border switch border_2 124. Fabric_3 130 can include an access switch or VTEP_31 132 and a border switch border_3 134.

Various hosts may be coupled to or communicate with each of the access switches (VTEPs 112, 114, 122, and 132), which may serve as first-hop access switches for a given host. These hosts and associated VTEPs may be grouped into VLANs. For example, a host_1 140 can be coupled to or communicate with VTEP_12 114 and be assigned a VLAN identifier of VLAN_20 106. A host_2 142 can be coupled to or communicate with VTEP_11 112 and be assigned a VLAN identifier of VLAN_10 104. A host_3 144 can be coupled to or communicate with VTEP_31 132 and be assigned the VLAN identifier of VLAN_20 106. A wireless controller 146 can be coupled to or communicate with VTEP_21 122 and be assigned a VLAN identifier of VLAN_10 104. Multiple wireless hosts 150 (such as hosts 152, 154, 156, and 158) can communicate with wireless controller 146.

Each access switch can maintain its own local client IP binding database which includes information on validated IP bindings for clients local to a given switch. As an example, VTEP_11 112 can include a local client IP binding database 113, while VTEP_31 132 can include a local client IP binding database 133. These is currently no way to synchronize the validated IP bindings of these separate local databases. Without an explicit solution in place (as described below), the information of clients' validated IP bindings may not be known to other switches within and between fabrics in the extended network. For example, although VTEP_11 112 and VTEP_12 114 are in the same fabric_1 110, each VTEP can only snoop into DHCP packets originating from or destined to its locally attached hosts. That is, VTEP_11 112 can only snoop into packets from/to host_2 142, and VTEP_12 114 can only snoop into packets from/to host_1 140. Such snooped packets can generally be unicasted to/from the DHCP server located in a centralized location (not shown). In addition, these snooped packets may not be leaked to remote fabrics. Thus, the DHCP packets generated from host_1 140 and host_2 142 (as part of fabric_1 110) will not be leaked to remote fabrics (e.g., fabric_2 120 and fabric_3 130), and those packets also cannot be snooped by remote access devices (e.g., VTEP_21 122 and VTEP_31 132). As a result, the learned IP binding information of clients is not shared between access switches, whether within a same fabric or across a remote fabric.

Figure 1B:
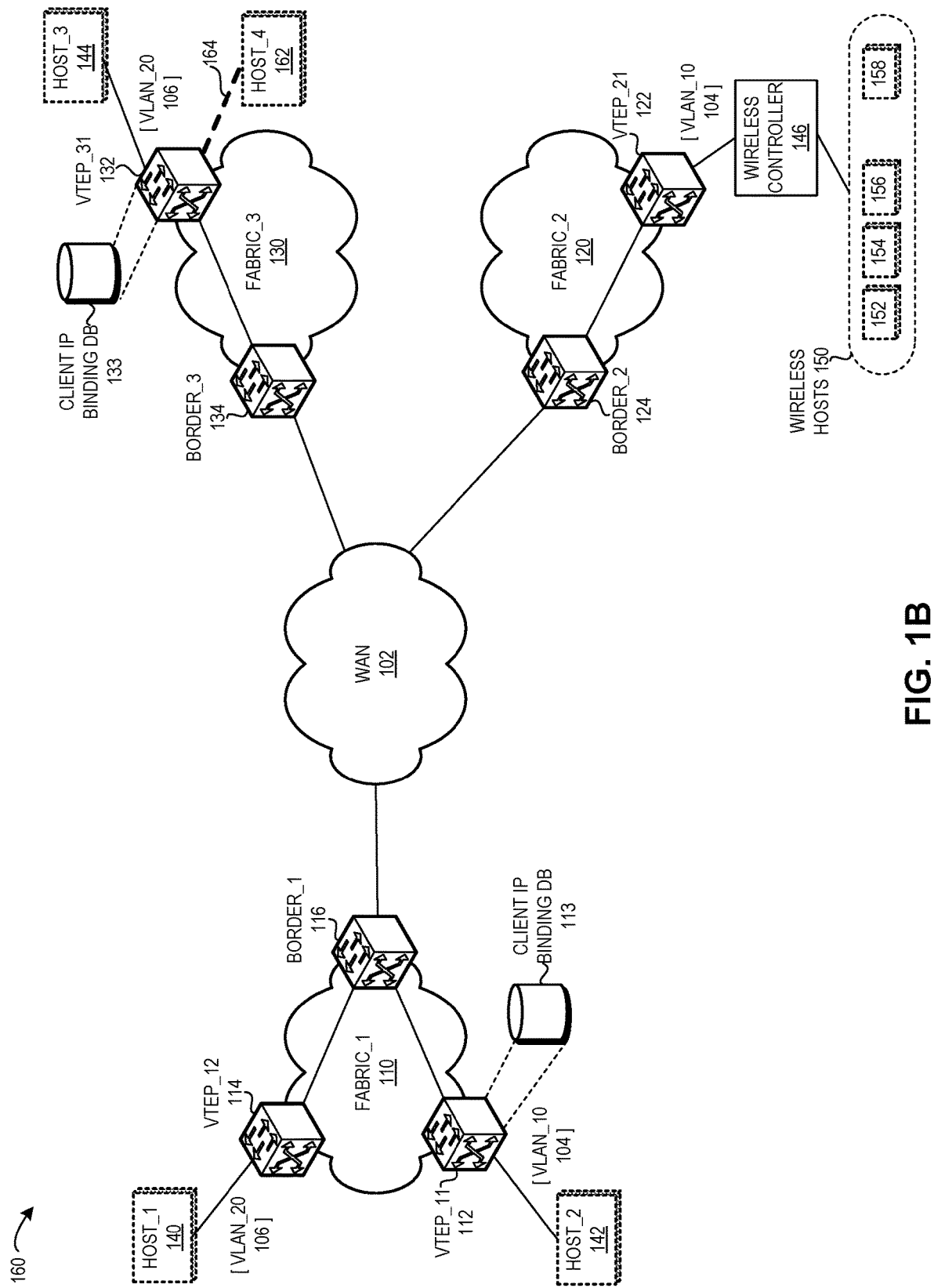
FIG. 1B illustrates an environment depicting the challenges of adding a new host in a Layer 2 extended network, in accordance with the prior art.
Figure 1C:
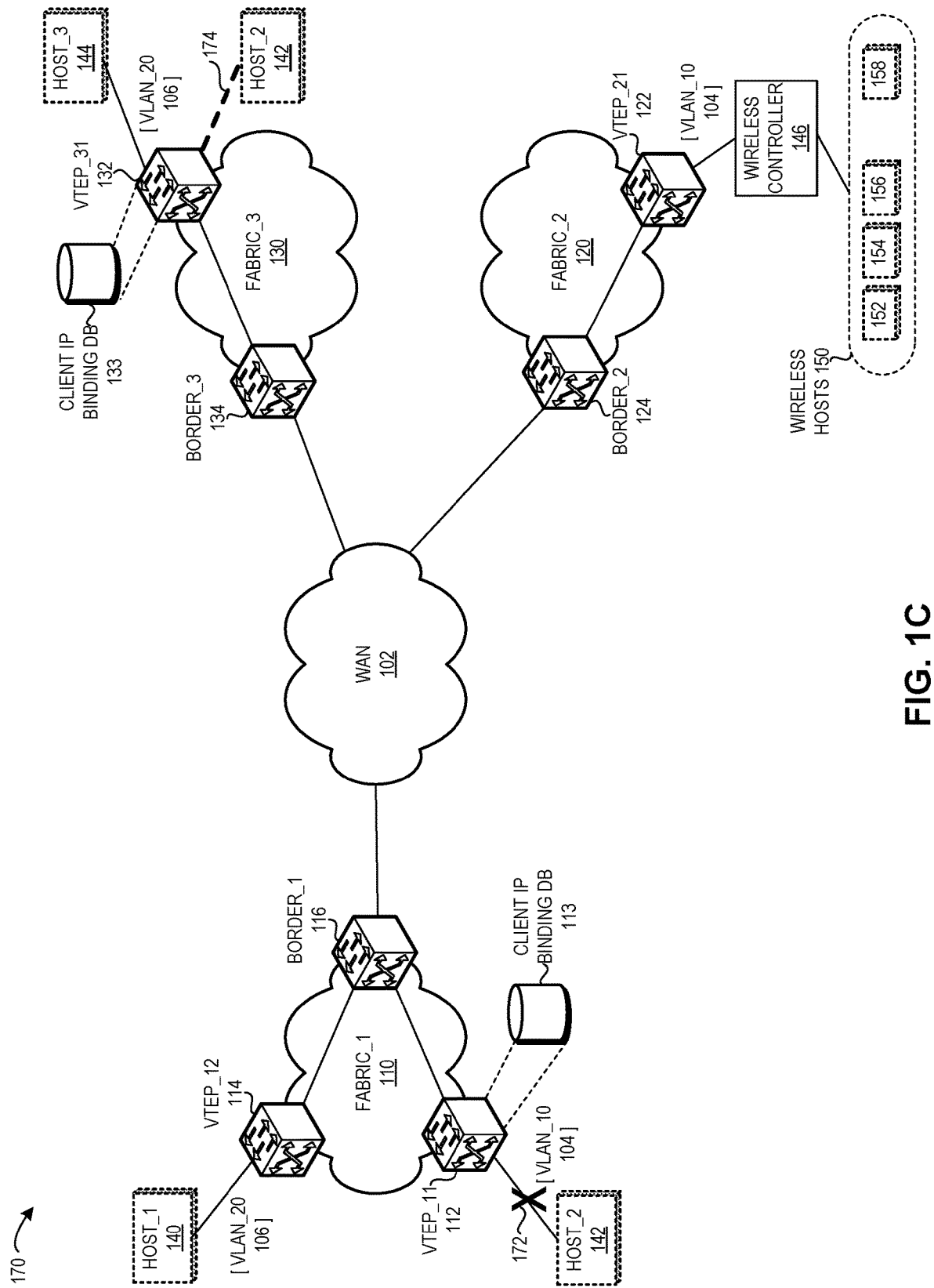
FIG. 1C illustrates an environment depicting the challenges of migrating a previously validated host in a Layer 2 extended network, in accordance with the prior art.

FIGS. 1B and 1C below describe two examples which demonstrate the challenges resulting from the lack of synchronization between the client IP binding databases of the various switches in the same extended network. FIG. 1B illustrates an environment 160 depicting the challenges of adding a new host in a Layer 2 extended network, in accordance with the prior art. In environment 160, a new host_4 162 is depicted as attempting to access VTEP_31 132 of fabric_3 130 (indicated by a bold dashed line 164). Because VTEP_31 132 stores no information in its client IP binding database 133 of host_4 162 as a validated client, VTEP_31 132 will deny access to host_4162.

FIG. 1C illustrates an environment 170 depicting the challenges of migrating a previously validated host in a Layer 2 extended network, in accordance with the prior art. In environment 170, VTEP_11 112 has already validated host_2 142 and stored the relevant information in its local client IP binding database 113. When host_2 142 moves or migrates to access VTEP_31 132 (where the original access is indicated by a bold X 172 on the original communication with VTEP_11 112 and where the new access is indicated by a bold dashed line 174), VTEP_31 132 will deny access to host_2 142. As with the new host example of FIG. 1B above, VTEP_31 132 stores no information in its client IP binding database 133 about host_2 142 as a validated client. Thus, VTEP_31 132 will treat host_2 142 the same as a new never-before-validated host (e.g., host_4 162) and deny access. VTEP_31 132 may subsequently perform its own security validation protocol on host_2 142. However, the lack of synchronization of the client IP binding databases across the extended network can result in both unnecessary and incorrect denials of access to legitimate and previously validated clients, as well as additional separate and unnecessary validations by each access switch.

One potential solution to address these limitations relating to synchronization of the client IP binding databases across an extended network can be to build these clients databases by sniffing into data plane packets. However, this solution has several problems. A first problem can arise because sniffing into data plane packets may require learnings over broadcast packets like ARP and ND. The access switches can trap gratuitous ARP (GARP) packets and learn of the existence of hosts behind (i.e., coupled to) a given access switch. The bridge-domain extension over fabrics may require these broadcast packets to travel over the WAN pipe (WAN 102) and may need to be refreshed periodically upon requests for host discovery.

For example, in the above environments of FIGS. 1A, 1B, and 1C, host_1 140 of fabric_1 110 can generate GARPs, which may be flooded to the remote fabrics (fabric_2 120 and fabric_3 130) in a typical data plane learning. Thus, the GARPs from host_1 140 may be broadcast through the fabrics and transmitted to each of border_1 116, VTEP_11 112, border_2 124, and border_3 134. Clients or hosts which are attached to the access switches may send GARP packets too frequently (i.e., too many and too frequently), which can result in aggravating the broadcast leaks over WAN 102.

DHCP snooping may not work here because, as discussed above, DHCP packets can only be snooped on the access switch side and not the fabric side. Thus, the snooped DHCP packets cannot travel to the remote fabrics. In addition, even in DHCP Relay-based deployments, the Relay configuration is local to a fabric and thus also cannot be leaked to the remote fabrics.

A second problem may arise when disparate VLANs within or across the fabrics are allocated with the same subnet or set of IP addresses. For example, VLAN_10 104 of fabric_1 110 and VLAN_20 106 of fabric_3 130 may be mapped to the same subnet gateway, e.g., 10.0.0.0/24. The client IP bindings (learned via DHCP or ND snooping and hosted respectively on, e.g., VTEP_11 112 and VTEP_31 132) may need to be synchronized as the broadcast domain is extended over a different VNI (e.g., a VNI of 100 mapped to VLAN_10 104 and a VNI of 200 mapped to VLAN_20 106). Thus, the IP bindings (allocations) are to be synchronized for the same (or a different) subnet, but across VLANs in disparate fabrics. This synchronization may not be possible given a deployment with either native VLAN extensions and VLAN-translation-based fabric extensions or static VxLAN-based network extensions.

As another example of this second problem, the same VLAN may be extended across disparate fabrics with different subnet allocations, e.g., clients associated with VTEP_12 114 on fabric_1 110 and VLAN_20 106 may be mapped to 10.0.0.0/24, while clients associated with VTEP_31 132 on fabric_3 130 and VLAN_20 106 may be mapped to 20.0.0.0/24. Thus, the same VLAN_20 106 may map to a different set of IP addresses (i.e., a different subnet) on different VTEPs across different fabrics. If the two fabrics are associated with two different companies which may be merging as part of a business merger/acquisition, the same VLAN_20 106 on each fabric may imply different features, including but not limited to the differently allocated subnets. For VTEPs across different fabrics, even though they may belong to the same VLAN, a given VTEP may drop the bindings of a remote VTEP as the differently allocated subnets can result in the given VTEP not recognizing the remote VTEP bindings.

A third problem with sniffing into data plane packets (e.g., using the data plane solution via GARPs and NDs) is that the flooding of such packets over the WAN to all remote fabrics may lead to unwarranted learning in fabrics over which no operator control exists. Assume that the three fabrics depicted in FIG. 1A belong to the same VLAN, i.e., that VLAN_10 104 is extended to all three fabrics 110, 120, and 130. It may be difficult to restrict the IP binding validation information only to one fabric. For example, if the same VLAN is extended to multiple fabrics, GARPs from fabric_1 110 will be broadcast to both of fabric_2 120 and fabric_3 130. This can result in information leakage and a security risk. The source fabrics (e.g., fabric_1 110) may not have control over flooding the WAN, in the same-VLAN configuration described in this example. There may be a need to selectively leak or restrict the synchronization between specific fabrics. One way to address this limitation is to use access control lists (ACLs), but ACLs can be expensive and may not be a feasible solution to this limitation.

Furthermore, in DHCP Relay-based deployments or configurations, the DHCP exchange can occur between a client-connected access switch and the server through a unicast channel. This predominate use case may prohibit other access switches from snooping into the DHCP packets of a given client.

A fourth problem involves updates. When a DHCP/IP binding is released or undergoes a lease expiry, there is currently no way to send a notification of the lease expiry using data plane-based updates. That is, the concept of "withdraw" does not exist using the dataplane solution because information learned via the EVPN tunnel over the dataplane does not include expiry information (unless a valid MAC is associated with it). In contrast, using the BGP EVPN control plane-based updates described herein, the state can be refreshed as part of a BGP withdraw message (as described further below). The BGP withdraw message can indicate that a certain MAC and IP binding is no longer valid, which message can be conveyed to all other remote VTEPs, as described further below.

A fifth problem can arise relating to Software-Defined Networking (SDN) gateways. A campus deployment may include SDN gateways which perform encryption of data packets, e.g., performing the security encapsulation. In cases which do not include SDN gateways, the issue of leaking GARPs may arise. The native encapsulation of broadcast, unknown-unicast, and multicast (BUM) traffic may not provide sufficient security. Furthermore, security issues may arise when compared to the native Message-Digest Algorithm 5 (MD5) encapsulation of the BGP control plane, which can leverage the security features of the underlying transport layer (e.g., Transmission Control Protocol (TCP)), as described in https://datatracker.ietf.org/doc/rfc7454/.

Summary of System which Facilitates Synchronization of Client IP Binding Database Across Extended Networks Leveraging BGP Control Plane There is currently no solution or technique which can address these problems relating to using a data plane-based deployment. The described aspects provide a system which addresses the above-described problems as well as the prior problems described in relation to FIGS. 1A and 1C. The described aspects can leverage the BGP EVPN control plane by piggybacking synchronization information in the generated BGP update messages. The BGP update messages can include multiple path attributes. In one path attribute, "MP_REACH_NLRI," the BGP update message can carry the network layer reliability information (NLRI) associated with a given client. The NLRI can indicate that the "EVPN NRLI" is a "MAC Advertisement Route" and that the "Route Type" is a "MAC Advertisement Route (2)" (i.e., a Route-Type-2). The NLRI can also indicate: the BGP Address Family Identifier (AFI); the Subsequent Address Family Identifier (SAFI); the IP binding information (i.e., the MAC and IP information); and the virtual network identifiers (VNIs).

In another path attribute, "EXTENDED_COMMUNITIES" (EC), the described aspects can extend or include a new EC path attribute, defined as a "Client IP Binding Sync" Extended Communities. EVPN can be used for a VxLAN fabric extension across the WAN, using the IP-based native-transport (underlay) encapsulation. Because EVPN provides the core of fabric deployments to support multi-homing and multi-tenancy, the extension of the BGP EVPN control plane can alleviate the challenges described above relation to synchronization of the client IP binding information between switches within and across fabrics in an extended network. The BGP update message can be configured to be applicable to all or selective hosts which are attached to a respective access switch. Note that in the BGP EVPN control plane, a host can be coupled or attached to more than one VTEP (which can indicate multi-homing) over a segment (e.g., an EVPN instance (EVI)).

Exemplary Format of Extended Communities Path Attribute with Client Binding Sync ID FIG. 2A illustrates an exemplary format 200 for an extended communities path attribute indicating a client IP binding synchronization identifier, in accordance with an aspect of the present application. Format 200 indicates octets 210 arranged in groups of four, with 8 bits per octet. Data 212 can include: a type 202 field (in bits 0-7); a sub-type 204 field (in bits 8-15); and a client IP binding synchronization identifier ("sync ID") 206 (indicated as 206.1 in bits 16-31 and 206.2 in bits 32-63). Details for the each of these three fields is provided below in relation to FIG. 2B.

FIG. 2B illustrates a table 230 indicating columns for a field 232, a size 234, and a description 236 for the format of an extended communities path attribute indicating a client IP binding synchronization identifier, in accordance with an aspect of the present application. A row 242 can indicate that the field "TYPE" is of a size which is 1 octet, and the corresponding description can state that the TYPE field can be a newly defined proprietary field. Row 242 can also indicate that this attribute is transitive, that is, the field cannot be changed by a receiving node during transit of the field (e.g., while the information is traveling through the network). Row 242 can also indicate that the value of one bit in the octet is set to a value of "0" to indicate the transitive (i.e., non-changeable) nature of this field.

A row 244 can indicate that the field "SUB-TYPE" is of a size which is 1 octet, and the corresponding description can state that the value of this SUB-TYPE field can be allocated as described in https://datatracker.ietf.org/doc/html/rfc4360#section-7 or set to any unallocated value within the range as defined in https://datatracker.ieft/doc/html/rfc7153#section 5.2. Furthermore, this SUB-TYPE field can be set to a value which can indicate to a receiving entity that the NLRI is to be processed for the purpose of synchronizing the IP binding information (e.g., the local client IP binding databases of the various switches).

A row 246 can indicate that the field "CLIENT IP BINDING SYNC ID" is of a size which is 6 octets, and the corresponding description can state that the value of this CLIENT IP BINDING SYNC ID field can be configured to categorize the IP-Binding instance. Furthermore, this field can be applicable to all data carried in the MAC and IP NLRI in the same BGP update message. The IP-Binding instance can be configurable and the value of this field can be dependent upon the implementation.

Figure 3:
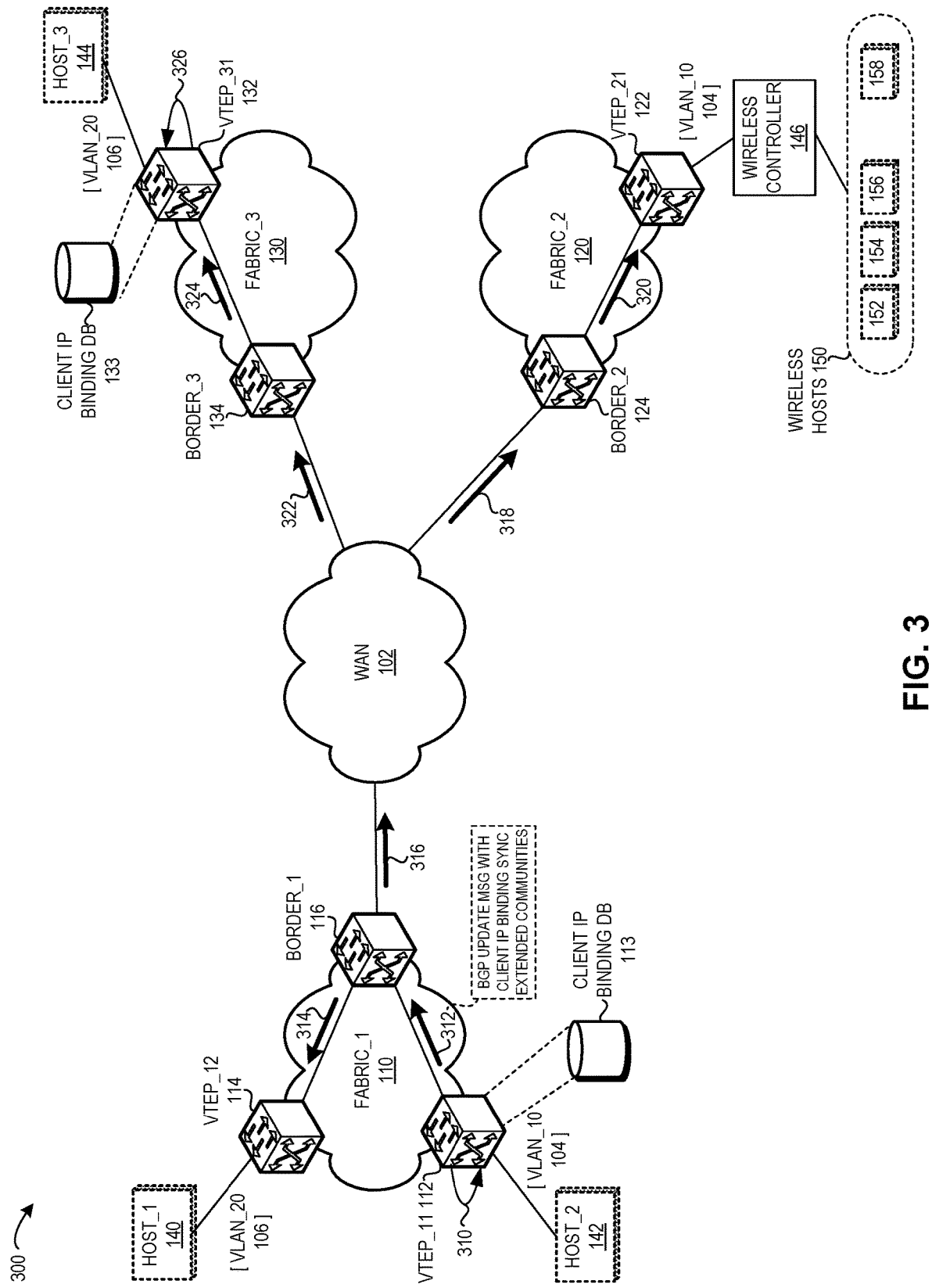
FIG. 3 illustrates an environment for a Layer 2 extended network, including communication of a Border Gateway Protocol (BGP) update message with the extended communities path attribute indicating a client IP binding synchronization identifier, in accordance with an aspect of the present application.

System Architecture which Facilitates Synchronization of Client IP Binding Database Across Extended Networks Leveraging BGP Control Plane FIG. 3 illustrates an environment 300 for a Layer 2 extended network, including communication of a Border Gateway Protocol (BGP) update message with the extended communities path attribute indicating a Client IP Binding Sync ID, in accordance with an aspect of the present application. Environment 300 is similar to environment 100 of FIG. 1A and further depicts operations related to including the new EC path attribute in a BGP update message.

Assume that VTEP_11 112 of fabric_1 110 is a sending node and that VTEP_31 on fabric_3 130 is a receiving node. In reality, the BGP update message may be broadcast to all or selected nodes in the extended network. During operation, an operator can configure a "first sync ID" which indicates validated IP binding information of an associated client. This first sync ID can be configured on all VTEPs in the Layer 2 extended network of environment 300. Each node can learn the MAC and IP information of its associated clients. For example, VTEP_11 112 can learn the MAC and IP information of its associated clients by local dynamic learnings. For example, host_2 142 may send a GARP towards VTEP_11 112, which GARP may be received over a host-facing (e.g., client-facing) gateway interface. This interface can be a VLAN interface mapped to the subnet, e.g., the interface associated with VLAN_10 104 on VTEP_11 112. Note that all hosts which are connected over VLAN_10 104 to VTEP_11 112 can be allocated the same subnet IP address and monitored by the IP-Binding instance (or other security validation application or protocols) hosted on VTEP_11 112. VTEP_11 112, via security validation applications or protocols, can validate the dynamically learned DHCP/IP bindings. VTEP_11 112 can also populate the relevant EVPN and ARP tables with the host learnings, and those MAC and IP bindings can be provided to the BGP EVPN protocols. VTEP_11 112 can also validate the IP bindings against its security protocols, e.g., to determine whether a validation is already in place for IP bindings of the associated client. If the validation is already in place, this indicates to the BGP EVPN protocol that the extra EC path attribute (including the configured first sync ID) is to be encapsulated in a BGP update message. These operations of VTEP_11 112 are depicted as an operation 310 in FIG. 3 and as described further below in relation to FIG. 4.

Sending Node Operations

As the sending node, VTEP_11 112 can generate and publish this BGP update message, which will be transmitted to: border_1 116 of fabric_1 110 (depicted as a BGP update message with the Client IP Binding Sync Extended Communities via a communication 312); VTEP_12 114 of fabric_1 110 (via a communication 314); border_2 124 of fabric_2 120 (via a communication 318); VTEP_21 122 of fabric_2 120 (via a communication 320); border_3 134 of fabric_3 130 (via a communication 322); and VTEP_31 132 of fabric_3 130 (via a communication 324). Because the BGP update message indicates in the EC path attribute carrying the first sync ID that the information is transitive, none of the nodes which receive the BGP update message may change this EC path attribute. That is, none of nodes 116, 114, 124, 122, 134, and 132 may change the EC path attribute information carrying the first sync ID.

Furthermore, the first sync ID carried in the EC path attribute can be configured via a knob or explicitly configured. The first sync ID can indicate a group of switches (e.g., a "Group of Access Switches") spread across fabrics which may intend to share the IP binding information, e.g., because the indicated group of switches may belong to part of the same client or group of clients. In addition, the sync ID can cater to IP allocation of the same client (or group of clients) over the same or different VLANs and subnets.

The configuration scope of the first sync ID can be global (i.e., applies to all BGP updates) or specific (i.e., applies to one or more groups of switches for which corresponding MAC and IP information is to be published, as indicated in the BGP update message). The determination of the configuration scope of the first sync ID can be based on the implementation and can also be based on the scope of the sync ID within a selected group of switches. In some aspects, in VLAN-based fabrics, the first sync ID can be inherited and/or derived from the extended communities path attribute of "Route-Target," which can be configured on the group of switches.

VTEP_11 112 may learn that a previously learned MAC and IP binding is no longer valid (e.g., the client times out or is no longer detected). VTEP_11 112 can generate and send a BGP withdraw message (also a Route-Type-2 packet), which, like the BGP update message, can carry the EC path attribute of the Client IP Binding Sync ID. This EC path attribute in the BGP withdraw message can indicate to BGP peers configured on the group of switches that the previously published MAC and IP bindings are no longer valid. That is, the BGP withdraw message can convey the invalidity of the previously published IP bindings. Note that as the sending node, VTEP_11 112 may not insert the EC path attribute in the BGP withdraw message if the corresponding IP bindings are still valid.

Receiving Node Operations

As the receiving node, VTEP_31 132 may receive the BGP update message (via communication 324). Recall that VTEP_31 132 has also already configured the first sync ID based on the operator configuration described above and that security applications or protocols on VTEP_31 132 have already validated its correspondingly learned IP bindings.

If VTEP_31 132 does not support the EC path attribute of the Client IP Binding Sync ID in the received BGP update message (i.e., the Route-Type-2 packet), VTEP_31 132 can ignore the processing of this EC path attribute while processing the other path attributes in the standard manner. VTEP_31 132 will not respond to the unsupported attribute with an error. In general, VTEP_31 132 may respond back only with the errors defined in https://datatracker.ietf.org/doc/html/rfc4379#section-3.1.

If VTEP_31 132 does support the EC path attribute of the Client IP Binding Sync ID in the received BGP update message (i.e., the Route-Type-2 packet), VTEP_31 132 can decode the EC path attribute and extract the Client IP Binding Sync ID. VTEP_31 132 can determine whether the extracted sync ID matches the locally configured sync ID. If a match is determined, then VTEP_31 132 can convey or import the NLRI to its security application or protocols. That is, VTEP_31 132 can extract from the BGP update message the reachability information (NLRI), which includes the MAC and IP information associated with an associated client. VTEP_31 132 can, via its security application or protocols, validate the MAC and IP information based on the security policies. VTEP_31 132 can also add (i.e., absorb) the MAC and IP information to its local client IP binding database. This can result in synchronization of the validated IP binding information of the associated client between VTEP_11 112 (e.g., the sending node) and VTEP_31 132 (the receiving node). While only one node is depicted as the receiving node in environment 300, the operations performed by exemplary receiving node VTEP_31 132 may also be performed by any of the other nodes in the extended network which also receive the BGP update message (and to which the configuration scope for the first sync ID applies).

If a match between the extracted sync ID and the locally configured sync ID is not determined or found, VTEP_31 132 does not convey or import the NLRI to its security application or protocols for further processing.

As discussed above, because the BGP update message indicates in the EC path attribute carrying the first sync ID that the information is transitive, none of the nodes which receive the BGP update message may change this EC path attribute. That is, none of nodes 116, 114, 124, 122, 134, and 132 may change the EC path attribute information carrying the first sync ID. For example, VTEP_11 112 may transmit the BGP update message to border_1 116 of fabric_1 110. Border_116 may transmit the BGP update message to VTEP_12 114 (via communication 314) in the same fabric (fabric_1 110). Border_1 116 may also send the BGP update message to its external BGP (eBGP) peers: border_2 124 of fabric_2 120 (via communication 318) and border_3 134 of fabric_3 130 (via communication 322). Neither of these eBGP peers may alter the value of the EC path attribute with the Client IP Binding Sync ID. The same logic can apply when the Route-Reflector attribute indicates routes between two internal BGP (iBGP) peers.

Thus, by leveraging the BGP control plane, the described aspects can facilitate synchronization of the client IP binding database (i.e., the allowed or validated host/client credentials) for switches across an extended or overlap network. This in turn may result in the prevention of rogue traffic or Denial of Service (DoS) attacks which originate in or are destined to the local network.

The described control plane solution can thus securely provide the client MAC/IP binding synchronization details to trusted sites or client-specific sites, while the details may also be encrypted with the EC path attribute for securing the protocol data units (PDUs) or packets. The described aspects of the control plan extension can also save on precious WAN bandwidth by avoiding the flooding of BUM traffic over the WAN. Furthermore, the described control plane extension can honor a client-controlled configuration, which can result in facilitating and aligning with the multi-tenancy properties of the extended or overlay network. The described aspects can further allow different VLANs across the extended network to be mapped to the same IP subnet, which allows a receiving entity to have knowledge regarding which local VLAN may be belonged to by a particular client (e.g., VxLANs). Finally, using the control plane extension of the described aspects can allow bulk data for IP bindings to be synchronized and refreshed with the BGP protocol-PDU.

Figure 4:
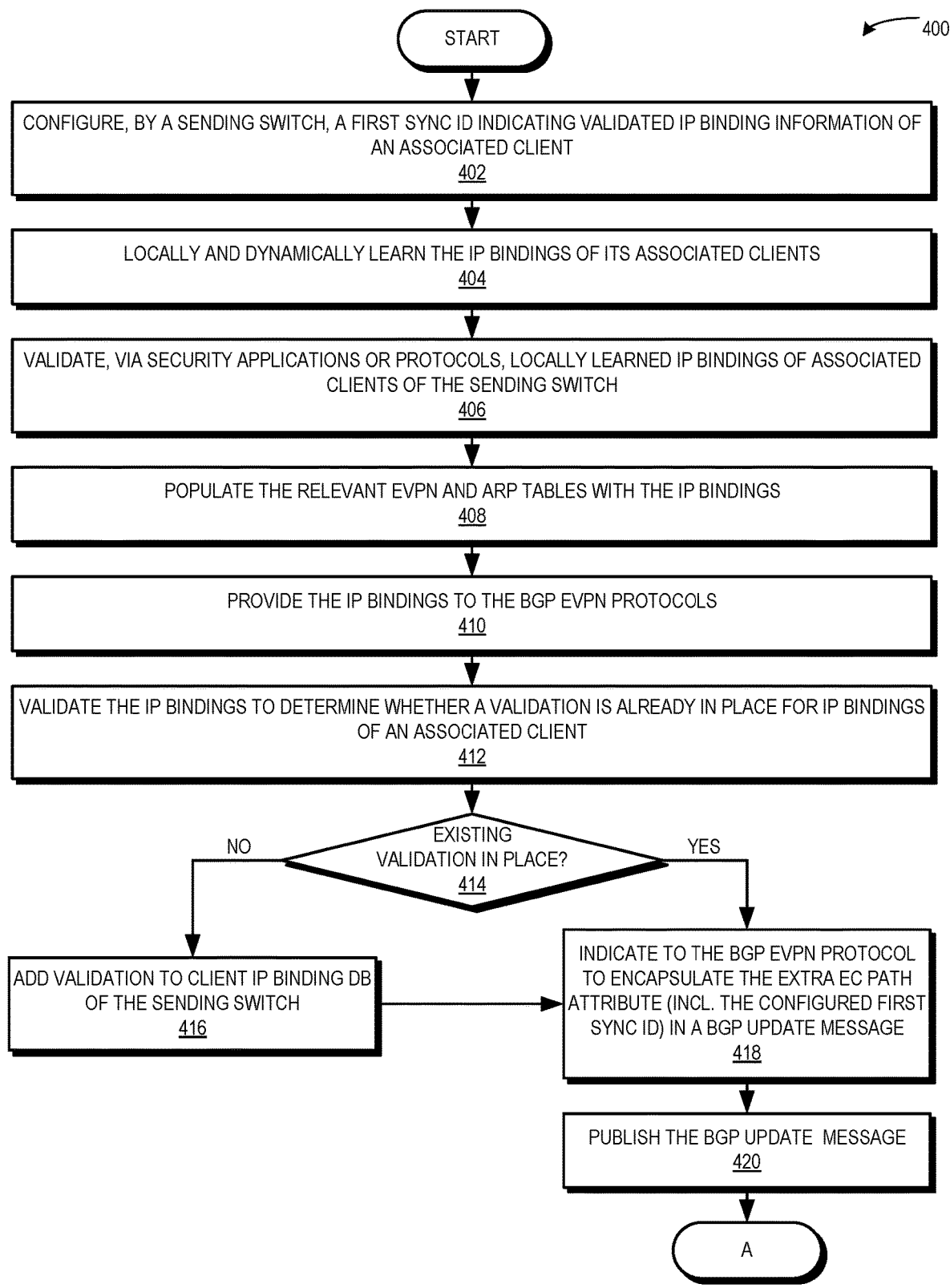
FIG. 4 presents a flowchart illustrating a method which facilitates synchronization of the client IP binding database across an extended network, including operations by a sending access switch, in accordance with an aspect of the present application.

Method for Facilitating Synchronization of Client IP Binding Database Across Extended Networks Leveraging BGP Control Plane FIG. 4 presents a flowchart 400 illustrating a method which facilitates synchronization of the client IP binding database across an extended network, including operations by a sending access switch, in accordance with an aspect of the present application. During operation, the system configures, by a sending switch (of an extended network which includes a plurality of switches), a first synchronization identifier indicating validated Internet Protocol (IP) binding information of an associated client (operation 402). The sending switch locally and dynamically learns the IP bindings of its associated clients, tenants, or hosts, e.g., via DHCP snooping and GARP or ND packets (operation 404). The sending switch validates, via security applications or protocols, locally learned IP bindings of associated clients of the sending switch (operation 406). The sending switch populates the relevant EVPN and ARP tables with the IP bindings (operation 408) and provides the IP bindings to the BGP EVPN protocols (operation 410). The sending switch also validates the IP bindings to determine whether a validation is already in place for IP bindings of an associated client (operation 412).

If a validation is not already in place (decision 414), the sending switch adds the validation to the client IP binding database of the switch (operation 416). If a validation is already in place (decision 414), the sending switch indicates to the BGP EVPN protocol to encapsulate the extra EC path attribute (including the configured first sync ID) in a BGP update message (operation 418). The sending switch publishes the BGP update message (e.g., by transmitting the BGP update message to the appropriate other switches in the extended network) (operation 420). The operation continues at Label A of FIG. 5A.

Figure 5A:
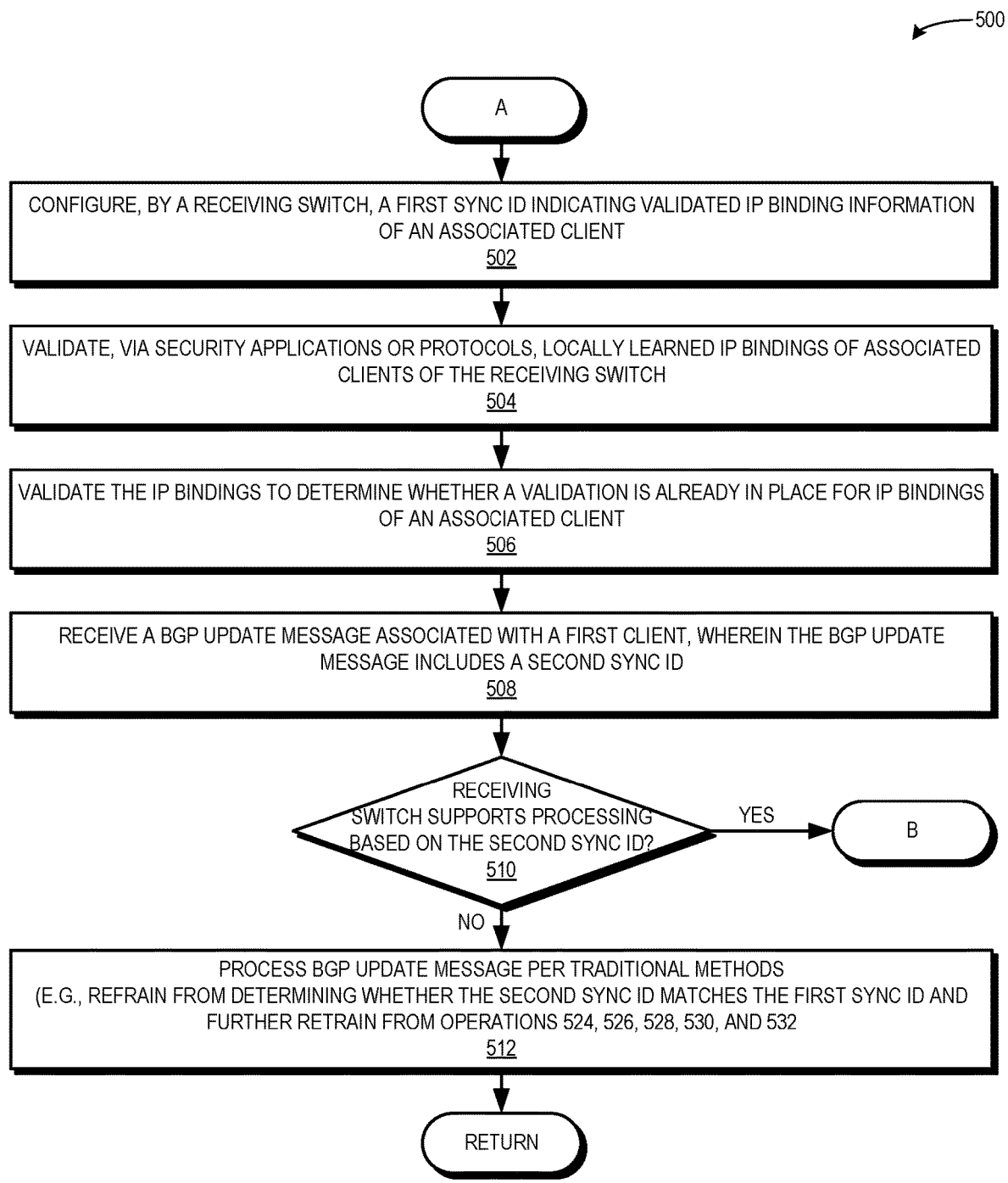
FIG. 5A presents a flowchart illustrating a method which facilitates synchronization of the client IP binding database across an extended network, including operations by a receiving access switch, in accordance with an aspect of the present application.

FIG. 5A presents a flowchart 500 illustrating a method which facilitates synchronization of the client IP binding database across an extended network, including operations by a receiving access switch, in accordance with an aspect of the present application. The system configures, by a receiving switch (of the extended network), a first synchronization identifier indicating validated Internet Protocol (IP) binding information of an associated client (operation 502). The receiving switch locally and dynamically learns the IP bindings of its associated clients, tenants, or hosts, e.g., via DHCP snooping and GARP or ND packets (not shown), similar to operation 404 performed by the sending switch.

The receiving switch validates, via security applications or protocols, locally learned IP bindings of associated clients of the receiving switch (operation 504). The receiving switch populates the relevant EVPN and ARP tables with the IP bindings and provides the IP bindings to the BGP EVPN protocols (not shown), similar to operations 408 and 410 performed by the sending switch. The receiving switch also validates the IP bindings to determine whether a validation is already in place for IP bindings of an associated client (operation 506). The receiving switch can publish its own BGP update messages based on the determination of operation 506, similar to decision 414 and operations 416, 418, and 420 performed by the sending switch.

The receiving switch receives a BGP update message associated with a first client, wherein the BGP update message includes a second synchronization identifier (operation 508). The receiving switch determines whether it supports processing based on the second synchronization identifier included in the BGP message (decision 510). If it does, the operation continues at Label B of FIG. 5B. If it does not, the receiving switch processes the BGP update message per traditional methods (e.g., by refraining from determining whether the second sync ID matches the first sync ID and further by refraining from operations 524, 526, 528, 530, and 530 of FIG. 5B), and the operation returns.

Figure 5B:
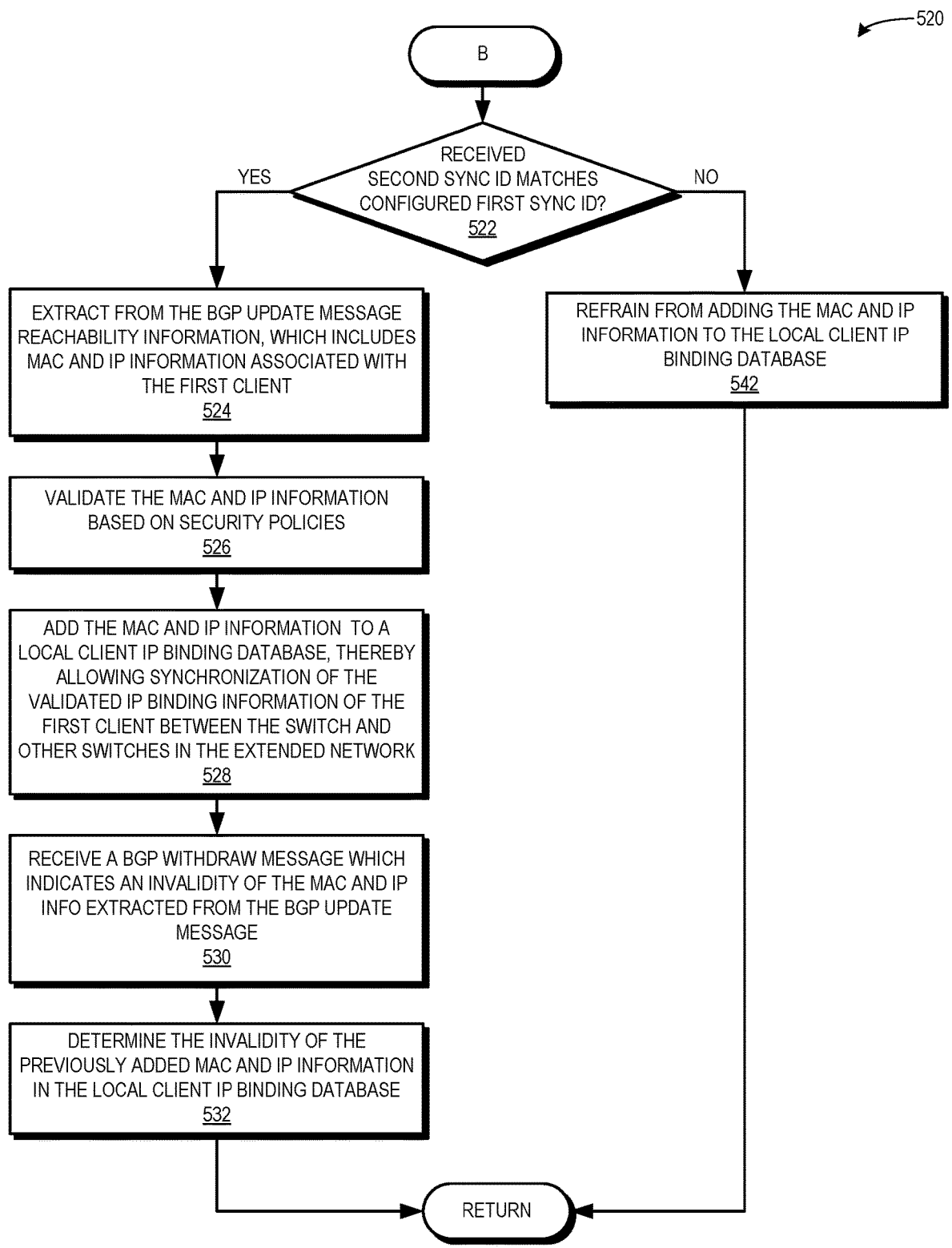
FIG. 5B presents a flowchart illustrating a method which facilitates synchronization of the client IP binding database across an extended network, including operations by a receiving access switch, in accordance with an aspect of the present application.

FIG. 5B presents a flowchart 520 illustrating a method which facilitates synchronization of the client IP binding database across an extended network, including operations by a receiving access switch, in accordance with an aspect of the present application. If the received second synchronization identifier matches the configured first synchronization identifier (decision 522), the receiving switch extracts from the BGP update message reachability information, which includes MAC and IP information associated with the first client (operation 524). The receiving switch validates the MAC and IP information based on security policies (operation 526). The receiving switch adds the MAC and IP information to a local client IP binding database, thereby allowing synchronization of the validated IP binding information of the first client between the switch and other switches (operation 528).

Subsequently, the receiving switch receives a BGP withdraw message which indicates an invalidity of the MAC and IP information previously extracted from the BGP update message (operation 530). This BGP withdraw message may be generated and sent by the sending switch upon detecting a time out, migration, or other change resulting in invalidity of the MAC and IP information of the first client (not shown). The receiving switch determines the invalidity of the previously added MAC and IP information in the local client IP binding database (e.g., by deleting the relevant entry) (operation 532), and the operation returns.

If the received second synchronization identifier does not match the configured first synchronization identifier (decision 522), the receiving switch refrains from adding the MAC and IP information to the local client IP binding database (operation 542) and the operation returns.

Figure 6:
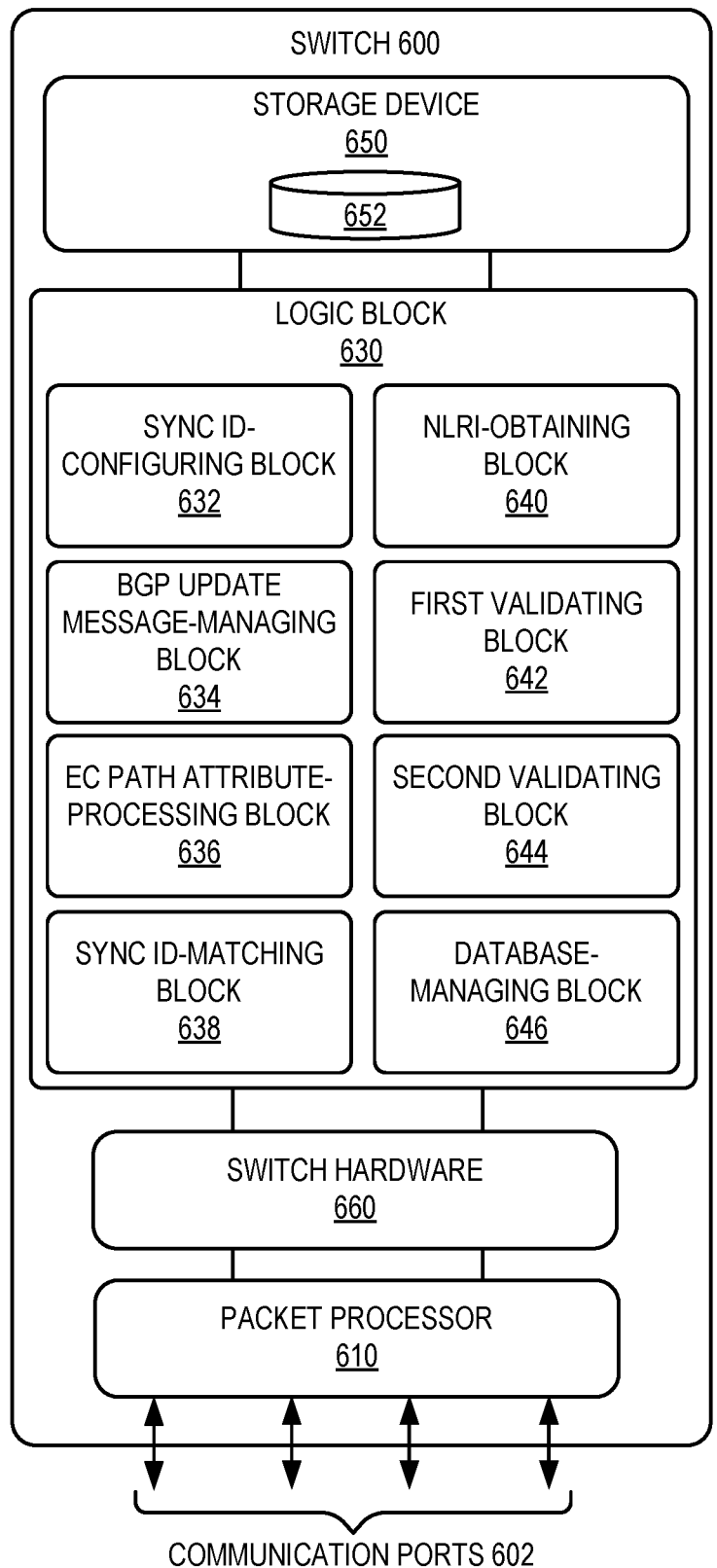
FIG. 6 illustrates an apparatus or switch which facilitates synchronization of the client IP binding database across an extended network, in accordance with an aspect of the present application.

Apparatus which Facilitates Synchronization of Client IP Binding Database Across Extended Networks Leveraging BGP Control Plane FIG. 6 illustrates an apparatus or a switch 600 which facilitates synchronization of the client IP binding database across an extended network, in accordance with an aspect of the present application. Switch 600 can include a number of communication ports 602, a packet processor 610, and a storage device 650. Switch 600 can also include switch hardware 660 (e.g., processing hardware of switch 600, such as its application-specific integrated circuit (ASIC) chips), which includes information based on which switch 600 processes packets (e.g., determines output ports for packets). Packet processor 610 can extract and process header information from the received packets. Packet processor 610 can identify a switch identifier (e.g., a MAC address and/or an IP address) associated with switch 600 in the header of a packet.

Communication ports 602 can include inter-switch communication channels for communication with other switches and/or user devices. The communication channels can be implemented via a regular communication port and based on any open or proprietary format. Communication ports 602 can include one or more Ethernet ports capable of receiving frames encapsulated in an Ethernet header. Communication ports 602 can also include one or more IP ports capable of receiving IP packets. An IP port is capable of receiving an IP packet and can be configured with an IP address. Packet processor 610 can process Ethernet frames and/or IP packets. A respective port of communication ports 602 may operate as an ingress port and/or an egress port.

Switch 600 can maintain a database 652 (e.g., in storage device 650). Database 652 can be a relational database and may run on one or more Database Management System (DBMS) instances. Database 652 can store at switch 600 information associated with facilitating synchronization of client IP binding databases and related information across extended networks by leveraging the BGP control plane. For example, the information can include validated IP bindings, MAC/IP information, an extended communities path attribute, and a synchronization identifier.

Switch 600 can further include a logic block 630 comprising, e.g.: a synchronization identifier-configuring block 632 to configure, by a switch, a first synchronization identifier indicating validated IP binding information of an associated client; a first validating block 642 to validate locally learned IP bindings of associated clients of the switch; a BGP update message-managing block 634 to receive a BGP update message associated with a first client, wherein the BGP update message includes a second synchronization identifier; an extended communities path attribute-processing block 636 to determine whether and that the switch supports processing based on the second synchronization identifier included in the BGP message; a synchronization identifier-matching block 638 to determine whether and that the second synchronization identifier matches the first synchronization identifier; a network layer reachability information-obtaining block 640 to extract from the BGP update message reachability information, which includes MAC and IP information associated with the first client; a second validating block 644 to validate the MAC and IP information based on security policies; and a database-managing block 646 to add the MAC and IP information to a local IP binding database, thereby allowing synchronization of the validated IP binding information of the first client between the switch and other switches.

In general, the disclosed aspects provide a method and system which facilitate synchronization of client IP binding databases across an extended network by leveraging the BGP control plane. In one aspect, the system, by a switch, configures a first synchronization identifier indicating validated Internet Protocol (IP) binding information of an associated client. The system receives a Border Gateway Protocol (BGP) update message associated with a first client, wherein the BGP update message includes a second synchronization identifier. Responsive to determining that the second synchronization identifier matches the first synchronization identifier, the system: extracts from the BGP update message reachability information, which includes media access control (MAC) and IP information associated with the first client; validates the MAC and IP information based on security policies; and adds the MAC and IP information to a local IP binding database, thereby allowing synchronization of the validated IP binding information of the first client between the switch and other switches.

In a further variation on this aspect, the system validates locally learned IP bindings of associated clients and updates the local IP binding database with the validated IP bindings of the associated clients.

In a further variation on this aspect, the first synchronization identifier is configured on all switches in the extended network.

In a further variation on this aspect, the system determines whether the switch supports processing based on the second synchronization identifier included in the BGP update message. Responsive to determining that the switch does not support processing based on the second synchronization identifier, the system refrains from determining whether the second synchronization identifier matches the first synchronization identifier and further refraining from the extracting, validating, and adding steps. Responsive to determining that the switch supports processing based on the second synchronization identifier, the system determines whether the second synchronization identifier matches the first synchronization identifier.

In a further variation, the switch and the other switches belong to an extended network provisioned by BGP. The BGP update message is transmitted by another switch in the extended network. The reachability information extracted from the BGP update message comprises Network Layer Reachability Information. The BGP update message is a Route-Type-2 message and includes a path attribute of an extended communities, wherein the extended communities path attribute indicates the second synchronization identifier. The system extracts the second synchronization identifier from the extended communities path attribute of the BGP update message.

In a further variation, responsive to determining that the second synchronization identifier does not match the first synchronization identifier, the system refrains from adding the MAC and IP information to the local IP binding database.

In a further variation, the system receives a BGP withdraw message which indicates an invalidity of the MAC and IP information extracted from the BGP update message. Responsive to receiving the BGP withdraw message, the system determines the invalidity of the previously added MAC and IP information in the local IP binding database.

In a further variation, a configuration scope of the first synchronization identifier comprises at least one of: a global configuration scope which applies to all BGP updates; and a specific configuration scope which applies to one or more groups of switches for which corresponding MAC and IP information is to be published as indicated in the BGP update message.

In a further variation, a respective switch comprises a virtual tunnel endpoint (VTEP), and a respective group of switches comprises a virtual local area network (VLAN).

In a further variation, the switch comprises an access switch. The extended network is an overlay network which comprises at least one of: an Ethernet virtual private network (EVPN); a virtual private local area network (LAN) service (VPLS); a virtual private wire service (VPWS); and a layer-3 virtual private network (L3-VPN). A fabric for the overlay network comprises at least one of: a virtual extensible local area network (VxLAN); a multi-protocol label switching (MPLS) technique; a network virtualization using generic routing encapsulation (NV-GRE); and a general protocol extension (GPE) technique.

In another aspect, a non-transitory computer-readable storage medium stores instructions that when executed by a computing system cause the computing system to perform the method described above, including in relation to FIGS. 3, 4, 5A, and 5B.

In yet another aspect, a computer system comprises processing circuitry, forwarding hardware, and a logic block. The logic block comprises the blocks described above, including in relation to FIG. 6.

The foregoing descriptions of aspects have been presented for purposes of illustration and description only. They are not intended to be exhaustive or to limit the aspects described herein to the forms disclosed. Accordingly, many modifications and variations will be apparent to practitioners skilled in the art. Additionally, the above disclosure is not intended to limit the aspects described herein. The scope of the aspects described herein is defined by the appended claims.

What is claimed is:

1. A computer-implemented method, comprising:
configuring, by a switch, a first synchronization identifier to indicate validated Internet Protocol (IP) binding information;
receiving a Border Gateway Protocol (BGP) update message associated with a first client, wherein the BGP update message includes a second synchronization identifier; and
responsive to determining that the second synchronization identifier matches the first synchronization identifier:
  extracting from the BGP update message reachability information, which includes media access control (MAC) and IP information associated with the first client;
  validating, based on security policies, the MAC and IP information associated with the first client; and
  adding the validated MAC and IP information associated with the first client to a local IP binding database, thereby allowing synchronization of the validated MAC and IP information associated with the first client between the switch and other switches.

2. The method of claim 1, further comprising:
validating locally learned IP bindings of associated clients; and
updating the local IP binding database with the validated IP bindings of the associated clients.

3. The method of claim 1, wherein the first synchronization identifier is configured on all switches in the extended network.

4. The method of claim 1, further comprising:
determining whether the switch supports processing based on the second synchronization identifier included in the BGP update message;
responsive to determining that the switch does not support processing based on the second synchronization identifier, refraining from determining whether the second synchronization identifier matches the first synchronization identifier and further refraining from the extracting, the validating, and the adding; and
responsive to determining that the switch supports processing based on the second synchronization identifier, determining whether the second synchronization identifier matches the first synchronization identifier.

5. The method of claim 1,
wherein the switch and the other switches belong to an extended network provisioned by BGP,
wherein the BGP update message is transmitted by another switch in the extended network,
wherein the reachability information extracted from the BGP update message comprises Network Layer Reachability Information,
wherein the BGP update message is a Route-Type-2 message,
wherein the BGP update message includes a path attribute of an extended communities,
wherein the extended communities path attribute indicates the second synchronization identifier, and
wherein the method further comprises extracting the second synchronization identifier from the extended communities path attribute of the BGP update message.

6. The method of claim 1, further comprising:
responsive to determining that the second synchronization identifier does not match the first synchronization identifier:
  refraining from adding the MAC and IP information associated with the first client to the local IP binding database.

7. The method of claim 1, further comprising:
receiving a BGP withdraw message which indicates an invalidity of the MAC and IP information associated with the first client and extracted from the BGP update message; and
responsive to receiving the BGP withdraw message, determining the invalidity of the previously added MAC and IP information associated with the first client in the local IP binding database.

8. The method of claim 1, wherein a configuration scope of the first synchronization identifier comprises at least one of:
a global configuration scope which applies to all BGP updates; and
a specific configuration scope which applies to one or more groups of switches for which corresponding MAC and IP information is to be published as indicated in the BGP update message.

9. The method of claim 1,
wherein a respective switch comprises a virtual tunnel endpoint (VTEP), and
wherein a respective group of switches comprises a virtual local area network (VLAN).

10. The method of claim 1,
wherein the switch comprises an access switch;
wherein the extended network is an overlay network which comprises at least one of:
  an Ethernet virtual private network (EVPN);
  a virtual private local area network (LAN) service (VPLS);
  a virtual private wire service (VPWS); and
  a Layer 3 virtual private network (L3-VPN); and
wherein a fabric for the overlay network comprises at least one of:
  a virtual extensible local area network (VxLAN);
  a multi-protocol label switching (MPLS) technique;
  a network virtualization using generic routing encapsulation (NV-GRE); and
  a general protocol extension (GPE) technique.

11. A non-transitory computer-readable storage medium comprising instructions that when executed by a computing system cause the computing system to:
- configure, by a switch, a first synchronization identifier to indicate validated Internet Protocol (IP) binding information;
- receive a Border Gateway Protocol (BGP) update message associated with a first client, wherein the BGP update message includes a second synchronization identifier; and
- responsive to determining that the second synchronization identifier matches the first synchronization identifier:
  - extract from the BGP update message reachability information, which includes media access control (MAC) and IP information associated with the first client;
  - validate, based on security policies, the MAC and IP information associated with the first client; and
  - add the validated MAC and IP information associated with the first client to a local IP binding database, thereby allowing synchronization of the validated MAC and IP information associated with the first client between the switch and other switches.

12. The non-transitory computer-readable storage medium of claim 11, further comprising instructions to:
- validate locally learned IP bindings of associated clients; and
- update the local IP binding database with the validated IP bindings of the associated clients.

13. The non-transitory computer-readable storage medium of claim 11, wherein a configuration scope of the first synchronization identifier comprises at least one of:
- a global configuration scope which applies to all BGP updates, wherein the first synchronization identifier is configured on all switches in the extended network; and
- a specific configuration scope which applies to one or more groups of switches for which corresponding MAC and IP information is to be published as indicated in the BGP update message.

14. The non-transitory computer-readable storage medium of claim 11, further comprising instructions to:
- determine whether the switch supports processing based on the second synchronization identifier included in the BGP update message;
- responsive to determining that the switch does not support processing based on the second synchronization identifier, refrain from determining whether the second synchronization identifier matches the first synchronization identifier and further refrain from the extracting, the validating, and the adding; and
- responsive to determining that the switch supports processing based on the second synchronization identifier, determine whether the second synchronization identifier matches the first synchronization identifier.

15. The non-transitory computer-readable storage medium of claim 11,
- wherein the switch and the other switches belong to an extended network provisioned by BGP,
- wherein the BGP update message is transmitted by another switch in the extended network,
- wherein the reachability information extracted from the BGP update message comprises Network Layer Reachability Information,
- wherein the BGP update message is a Route-Type-2 message,
- wherein the BGP update message includes a path attribute of an extended communities, wherein the extended communities path attribute indicates the second synchronization identifier, and
- wherein the method further comprises extracting the second synchronization identifier from the extended communities path attribute of the BGP update message.

16. The non-transitory computer-readable storage medium of claim 11, wherein the method further comprises:
- responsive to determining that the second synchronization identifier does not match the first synchronization identifier:
  - refraining from adding the MAC and IP information to the local IP binding database.

17. The non-transitory computer-readable storage medium of claim 11, further comprising instructions to:
- receive a BGP withdraw message which indicates an invalidity of the MAC and IP information associated with the first client and extracted from the BGP update message; and
- responsive to receiving the BGP withdraw message, determine the invalidity of the previously added MAC and IP information associated with the first client and in the local IP binding database.

18. The non-transitory computer-readable storage medium of claim 17,
- wherein the BGP update message and the BGP withdraw message are further received by at least one of a first internal BGP (iBGP)-peer entity and one or more external BGP (eBGP)-peer entities and processed in a similar manner as by the switch.

19. The non-transitory computer-readable storage medium of claim 11,
- wherein the switch comprises an access switch;
- wherein the extended network is an overlay network which comprises at least one of:
  - an Ethernet virtual private network (EVPN);
  - a virtual private local area network (LAN) service (VPLS);
  - a virtual private wire service (VPWS); and
  - a Layer 3 virtual private network (L3-VPN); and
- wherein a fabric for the overlay network comprises at least one of:
  - a virtual extensible local area network (VxLAN);
  - a multi-protocol label switching (MPLS) technique;
  - a network virtualization using generic routing encapsulation (NV-GRE); and
  - a general protocol extension (GPE) technique.

20. An computer system, comprising:
- processing circuitry;
- forwarding hardware;
- a logic block comprising:
  - a synchronization identifier-configuring block to configure, by a switch, a first synchronization identifier to indicate validated Internet Protocol (IP) binding information;
  - a first validating block to validate locally learned IP bindings of associated clients of the switch;
  - a BGP update message-managing block to receive a Border Gateway Protocol (BGP) update message associated with a first client, wherein the BGP update message includes a second synchronization identifier;
  - an extended communities path attribute-processing block to determine whether and that the switch supports processing based on the second synchronization identifier included in the BGP message;

a synchronization identifier-matching block to determine that the second synchronization identifier matches the first synchronization identifier;
a network layer reachability information-obtaining block to extract from the BGP update message reachability information, which includes media access control (MAC) and IP information associated with the first client;
a second validating block to validate, based on security policies, the MAC and IP information associated with the first client; and
a database managing block to add the validated MAC and IP information associated with the first client to a local IP binding database, thereby allowing synchronization of the validated MAC and IP information associated with the first client between the switch and other switches.

\* \* \* \* \*